United States Patent [19]

Lind et al.

[11] Patent Number: 4,901,304
[45] Date of Patent: Feb. 13, 1990

[54] ERASABLE OPTICAL DATA STORAGE MEDIUM HAVING A ZONED INTEGRAL RECORDING LAYER

[75] Inventors: Michael A. Lind, Durham; W. Eugene Skiens, Wilsonville; Clyde D. Feyrer; John W. Swanson, both of Portland, all of Oreg.

[73] Assignee: Optical Data, Inc., Beaverton, Oreg.

[21] Appl. No.: 916,609

[22] Filed: Oct. 8, 1986

[51] Int. Cl.⁴ .............................................. G11B 7/24
[52] U.S. Cl. .................... 369/284; 346/135.1; 369/275; 430/19; 430/270; 430/495; 430/945
[58] Field of Search ............. 369/100, 275, 283, 286, 369/284; 346/135.1; 430/19, 945, 495, 270

[56] References Cited

U.S. PATENT DOCUMENTS

| 4,264,986 | 4/1981 | Willis | 365/124 |
|---|---|---|---|
| 4,278,734 | 7/1981 | Ohta et al. | 365/106 |
| 4,285,056 | 8/1981 | Bell | 369/284 |
| 4,300,227 | 11/1981 | Bell | 369/275 |
| 4,336,545 | 6/1982 | Howe et al. | 346/135.1 |
| 4,398,203 | 8/1983 | Cornet | 369/100 |
| 4,404,656 | 9/1983 | Cornet | 369/275 |
| 4,430,659 | 2/1984 | Maffitt et al. | 369/284 |
| 4,527,173 | 7/1985 | Gupta et al. | 369/100 |
| 4,577,291 | 3/1986 | Cornet | 369/275 |
| 4,578,788 | 3/1986 | Ahn et al. | 369/284 |
| 4,651,172 | 3/1987 | Watanabe et al. | 346/135.1 |
| 4,719,615 | 1/1988 | Feyrer et al. | 369/284 |
| 4,780,867 | 10/1988 | Lind et al. | 369/284 |

FOREIGN PATENT DOCUMENTS 0136070 4/1985 European Pat. Off.

Primary Examiner—Steven L. Stephan
Attorney, Agent, or Firm—Chernoff, Vilhauer, McClung & Stenzel

[57] ABSTRACT

An erasable optical data storage medium has an integral recording layer including an expansion zone and a retention zone having different optical and thermal-mechanical properties. A uniform integral layer of dyed polymer material has the dye leached out of the surface region and a second dye diffused into the surface region to create a retention zone. The retention zone has a higher elastic modulus and glass transition temperature than the underlying expansion zone and is adapted to absorb and transmit light which is centered about a different wavelength than the expansion zone. The medium is adapted to be used with a non-ablative and non-vesicular method to create and erase optically detectable deformations in the retention zone.

30 Claims, 1 Drawing Sheet

ERASABLE OPTICAL DATA STORAGE MEDIUM HAVING A ZONED INTEGRAL RECORDING LAYER

BACKGROUND OF THE INVENTION

This invention relates to an erasable optical data storage medium and particularly to such a medium including an integral recording layer having zones of different optical and thermal-mechanical properties, and to a method for constructing such a medium.

Within the past decade there has been tremendous interest and developmental work in the area of optical data recording and storage techniques, primarily because of the significant advantage such technology offers over magnetic data technology including storage capacity and archival life. One of the reasons optical data technology has not yet supplanted magnetic data recording and storage techniques is the lack of an effective, reliable, and economical optical data storage medium which is also erasable.

Substantially all of the optical data storage mediums involve multi-layer structures. However, not all of the layers of the medium are actually involved in actively recording or erasing data in the medium. Most mediums include non-active layers as supporting substrates or protective overlays. While some optical data storage mediums have a single active or recording layer, other mediums have two or more active or recording layers.

It is elementary that the structure of the medium is related to the method which is used for recording and erasing data in that medium. For example, a medium having a dual active recording layer might typically have one metallic layer and one organic layer. A method associated with such a medium would involve heating the metal layer until the organic layer adjacent thereto evaporates, forming either an optically detectable crater (ablative method) or an optically detectable bubble (vesicular method) in the medium. Mediums of the type described above are disclosed in the following: Cornet, U.S. Pat. Nos. 4,404,656, 4,577,291, 4,398,203.

A related medium might use a dyed, light-absorbtive layer rather than a metal layer to absorb heat from the laser and form ablative deformations, such as craters, or vesicular deformations, such as bubbles, in the medium. Mediums of this type are disclosed in Maffit U.S. Pat. No. 4,430,659 and Bell U.S. Pat. Nos. 4,285,056 and 4,300,227.

A pending patent application filed by applicant's assignee discloses a structure having a dual recording layer for use with a non-ablative, non-vesicular technique. Pursuant to MPEP 608.01(p) commonly owned U.S. patent application Ser. No. 525,813 is incorporated herein by reference with particular attention drawn to the description of the prior art contained therein, the method disclosed therein for recording and erasing data, and to the system described therein for recording, reading and erasing data. The medium disclosed in the commonly owned prior application employed two discrete polymer layers, an expansion layer and an overlying retention layer, each layer having different optical and thermal-mechanical properties. The method associated with this medium involves selectively heating one or the other of the layers and employing the different thermal-mechanical properties of the two layers to selectively record or erase data in the form of optically detectable deformations in the medium. More particularly, to record, the heated expansion layer pushes on and viscoelastically deforms the retention layer thereby creating an optically detectable and reversible deformation which is held in place by the retention layer. To erase, the retention layer is heated above its glass transition temperature and is pulled back to its original conformation by the elastically strained expansion layer.

With respect to mediums having a single active layer, an ablative technique is often used to burn away a portion of the active layer to form an optically detectable pit or crater in the active layer as disclosed in Howe U.S. Pat. Nos. 4,336,545 and 4,360,908. Other methods associated with mediums having single recording layers involve changing the optical density of the active layer such as disclosed in Willis U.S. Pat. No. 4,264,986 and Ohta U.S. Pat. No. 4,278,734.

The data storage mediums which are adapated to be used with ablative or vesicular techniques are generally not erasable since such methods involve heating a portion of the medium until it evaporates or changes state. Mediums which use two or more active or recording layers are generally more difficult and expensive to build and have the inherent problem of ensuring that the active layers remain bonded to each other during the recording and erasing steps.

SUMMARY OF THE INVENTION

The improved optical data storage medium of the present invention overcomes some of the problems described above. According to the exemplary embodiment, the erasable optical data storage medium of the present invention includes a data recording layer of a single integral material having at least two zones of differing optical and thermal-mechanical properties.

The exemplary medium is constructed by forming a substantially uniform layer of homogeneous material on a supporting substrate and subsequently treating the surface region of the layer so as to create a zone within the material having different optical and thermal-mechanical properties than the rest of the material. The layer may be treated with solvents, dyes, or heat, or combinations thereof, to create a zone in the layer which has different properties than the underlying material.

The medium disclosed herein is adapted to be erasable and consequently employs a non-ablative, non-vesicular method.

Accordingly, it is a principal object of the present invention to provide an improved erasable optical data storage medium.

It is a further object of the present invention to provide such a medium containing a recording layer of a single integral material containing zones therein of different optical properties.

It is an associated object of the present invention to provide such a medium wherein such zones have different thermal-mechanical properties.

It is a related object of the present invention to provide such a medium which is adapted to be used with non-ablative, non-vesicular recording methods.

It is a related object of the present invention to provide such a medium which avoids the problem of bonding the layers of the medium together.

It is another object of the present invention to provide such a medium which is relatively inexpensive to produce.

It is another object of the present invention to provide a method for constructing such a medium.

It is a further object of the present invention to provide a method for treating a layer of a single integral material so as to create zones of differing optical and thermal-mechanical properties.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
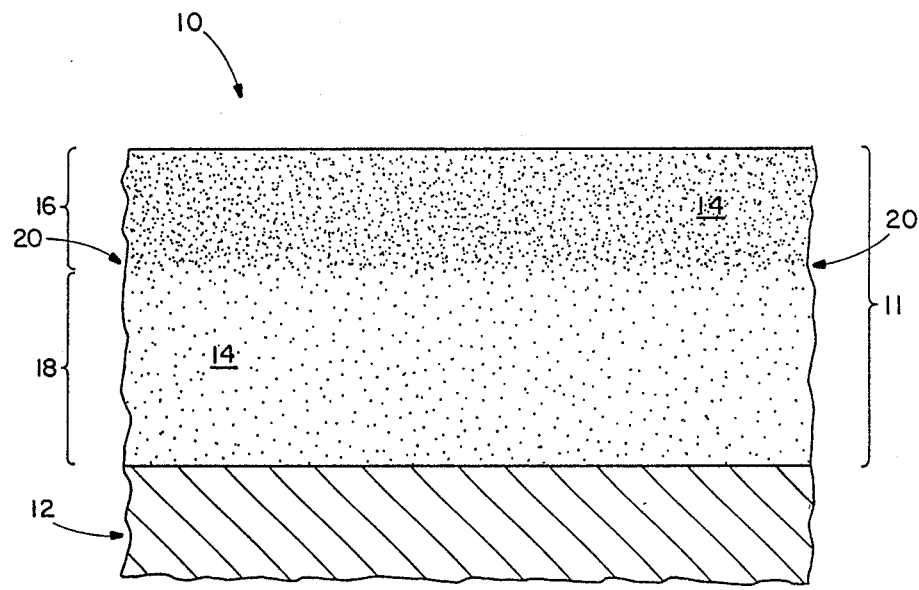
FIG. 1 shows the exemplary embodiment of the optical data storage medium of the present invention.

Referring to FIG. 1, the exemplary embodiment of the optical data storage medium 10 of the present invention having a single active or recording layer 11 of a single integral material 14 is shown supported upon and bonded to a substrate 12, typically of glass, plastic, or aluminum. The recording layer includes two zones, an upper retention zone 16 and a lower expansion zone 18 proximate the substrate, such zones having differing optical and thermal-mechanical properties. The expansion zone is so termed because expansion of material in this zone creates an optically detectable deformation in the medium. The retention zone is so named because it is adapted and constructed to retain the optical detectable deformation created by the expansion zone.

As an aid to explaining the nature and properties of the medium and its zones, and the method for recording and erasing data therein, it may be helpful to discuss the process of constructing such a medium having a zoned integral recording layer.

An exemplary medium of the present invention may be constructed by depositing a solvent-cast layer 11 of a polymer material 14 on a substrate 12 and creating a retention zone 16 in the polymer material that is substantially different in molecular structure and higher in elastic modulus than the underlying polymer material which makes up the expansion zone 18. The retention zone would also have different optical properties, adapted to selectively absorb or transmit light centered about a different wavelength than the underlying expansion zone. Other typical properties of the retention zone are that it would have a glass transition temperature substantially higher than that of the expansion zone.

The retention zone may be created by a suitable choice of solvents, dyes and/or casting and curing conditions. An exemplary construction process may involve leaching a first dye out of the surface region of the material 14 comprising the single layer 11 and selectively diffusing a second dye into the surface region of the material using suitable solvents and techniques. This creates a single integral layer of material having a surface zone dyed with the second dye and an underlying zone dyed with the first dye, thereby creating two optical zones within the layer of integral material.

The dyes are selected to absorb light in a narrow wavelength band around a selected wavelength. Light energy is typically absorbed in that portion of the material which is closest to the light source. Approximately 63% of the light is absorbed in the one "skin depth" of the material. In terms of the present invention, the skin depth of a material is a function of the particular wavelength, the dye, and the material.

The first dye is selected to absorb light in a narrow wavelength band centered around a first wavelength. When the first dye is leached out of the surface region of the layer of material by the solvent, the optical characteristics of the surface region is changed from substantially absorbing light at the first wavelength to substantially transmitting light at the first wavelength. Therefore, when the medium is exposed to light of the first wavelength, the retention zone will transmit the light through to the underlying expansion zone. Since the first dye is still retained in the expansion zone, the material of the expansion zone will absorb the light energy in one skin depth of material and become heated.

A second dye may be diffused into surface region of the material (from which the first dye has been leached) with a suitable solvent causing the retention zone to absorb light in a narrow wavelength band centered around a second wavelength. Thus, two optical zones are created in the material, each zone adapted to absorb light of a different wavelength. At this point it should be noted that the interface 20 between the zones is diffuse, rather than discrete as it would be in a typical medium having multiple active layers such as disclosed in the commonly owned Feyrer et al. U.S. Pat. No. 4,719,615 (Ser. No. 835,960). It should also be understood that the optical and thermal-mechanical properties of the zones are not thought to be uniform through the depth of each zone, but are likely to be graded throughout the depth of the layer.

The use of suitable solvents to leach out the first dye and to diffuse in the second dye also serves to create a surface region, corresponding to the retention zone, in the material. As the solvents evaporate, the molecular structure of the surface region is altered significantly increasing the elastic modulus of the retention zone. Application of the solvents in the dye leaching and diffusing steps tends to swell the surface region of the material. When the solvents are driven off or evaporate, the swelling subsides but the molecular structure of the surface region has been altered. It is estimated that the retention zone formed by the process may have an elastic modulus several times that of the original material. This process also has the effect of raising the glass transition temperature of the retention zone.

Example

Formulation of Material

| | |
|---|---|
| Urethane 100 phr | Morton Thiokol - Solithane 113 |
| Curing Agent A 7.3 phr | Morton Thiokol - C113-300 |
| Curing Agent B 13.2 phr | TIPA (triisopropanolamine) |
| Dye 30 phr | Sandoz - Savinyl Blue RLS |
| Solvent 200 phr | Methyl Ethyl Ketone |
| Surfactant 11 phr | 3M - Fluorad FC-430 |

The formulation set forth above was mixed together and filtered through a 0.2 micrometer ($\mu$m) membrane before being puddled on a substrate mounted in a spin coating instrument. The substrate with the material puddled thereon was spun at 900 rpm for 10 seconds and the resulting coated substrate was cured in an oven at 100° C. for 16 hours to create a uniform layer of blue dyed urethane material, approximately 6.0 $\mu$m thick on the substrate. The blue dyed material had a skin depth of approximately 1.0 $\mu$m for $L_1$ (light at 633 nanometers (nm)) and approximately 10.0 μm for $L_2$ (light having a wavelength of 488 nm).

After curing, the coated substrate was placed back on the spin coater and a 4% solution of red dye (Sandoz Savinyl Scarlet RLS) in methylene chloride was dispensed onto the coated substrate spinning at 5000 rpm for 30 seconds. The coated substrate was then placed in a 60° C. oven for a short period of time (approximately one hour) to ensure all solvent was evaporated. Application of the red dye and solvent onto the blue-dyed urethane layer has the effect of "exchanging" the red dye for the blue dye in the surface region of the urethane layer. Leaching out the blue dye and diffusing in the red dye can also be done in two separate steps.

Although it is difficult to accurately measure skin depth in a zoned integral structure, applicants' tests have revealed that the relative absorbance of the medium at $L_2$ (488 nm) was doubled after the red dye was diffused into the material.

Static optical testing on the medium described above showed that optically detectable deformations could be created in the medium by 0.6 microseconds (μs) exposure to $L_1$ at 6.0 milliwatts (mW) and that such deformations could be erased by 2.5 μs exposure to $L_2$ at 3.0 mW. Further testing showed that the medium could undergo 100 to 500 write/erase cycles before the medium lost the ability to provide suitable contrast.

A modification of the medium and method of the previous example might involve a uniform layer of dyed plasticized polymer material deposited on a substrate. Suitable solvent(s) are used to leach the first dye and plasticizer out of the surface region of the material and to diffuse in a second dye thereby creating a zoned integral layer having zones of differing optical and thermal-mechanical properties. As in the example above, this may be done in one or more steps. It will be readily understood that leaching the plasticizer out of the surface region creates a retention zone having an increased elastic modulus.

Another medium which would be within the concept of this invention would be a dual active layer polymer structure in which a monomer or prepolymer in a solvent system would be diffused into an integral polymer layer creating a medium having two zones with a diffuse interface between the zones and forming an interpenetrating network of two polymer materials having appropriate thermal-mechanical properties.

A method for recording data in the medium of the present invention in a non-ablative and non-vesicular manner is generally described in commonly owned patent application Ser. No. 525,813. As applied to the medium of the present invention, the method would use a focused laser beam B of $L_1$ (633 nm) to heat the material of the expansion zone, causing localized, rapid, elastic swelling of a portion of the expansion zone, such swelling pushing on and causing deformation of the retention zone. It is to be recalled that much of the blue dye has been leached out of the retention zone, allowing the retention zone to primarily transmit, rather than absorb, $L_1$.

Figure 2:
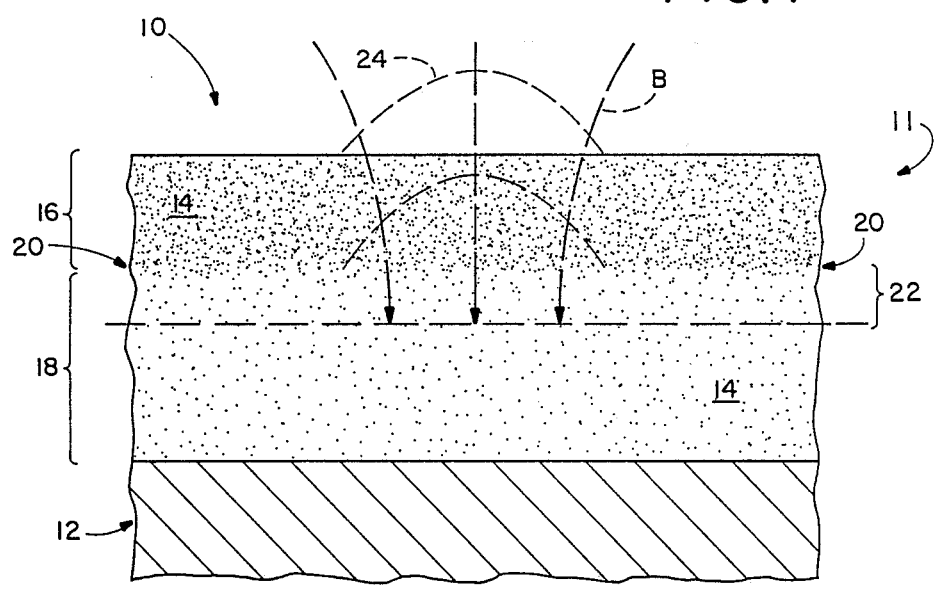
FIG. 2 shows a focused laser recording beam acting on the exemplary medium of FIG. 1.

Referring to FIG. 2, it will be understood that rapid, localized, elastic swelling of the expansion zone occurs primarily within one optical skin depth 22 in the material of the expansion zone, extending approximately 1.0 m below the diffuse interface 20 of the retention and expansion zones. Swelling of the material of the expansion zone in this region pushes on the retention zone, creating an optically detectable deformation shown as a bump 24 in the retention zone.

If the material of the retention zone has been raised above its glass transition temperature by the heating of the adjacent expansion zone, the swelling causes elastic tensile deformation of the retention zone. As the medium cools, the material of the expansion zone starts to shrink, but is not permitted to completely relax the bump because the retention layer also cools and, falling below its glass transition temperature, hardens, retaining the optically detectable deformation and leaving the retention zone in compression and the expansion zone in tension.

In an alternative method, sometimes referred to as "cold working" the retention zone is not raised above its glass transition temperature and the rapid, localized, elastic swelling of the expansion zone causes first elastic shear deformation, then viscoelastic shear deformation of the retention zone. As the medium cools, the elastic shear deformation is recovered, but the viscoelastic shear deformation is retained.

In both methods described above, the optically detectable deformation may be erased by using a focused laser beam of $L_2$ (488 nm) to heat the retention zone without substantially heating the expansion zone, raising the material of the retention zone above its glass transition temperature. When the retention zone becomes pliable, the tensioned material of the expansion zone pulls down the bump in the retention zone, removing the deformation.

It is contemplated that the medium of the present invention is suitable for use with a flexible substrate as well as a rigid substrate.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. An erasable optical data storage medium comprising:
    (a) a data recording layer of a single integral material; and
    (b) said data recording layer having a first zone and a second zone, said zones treated to yield different optical properties.

2. The medium of claim 1 wherein said data recording layer is substantially planar, said first and second zones defining substantially parallel, adjacent planes extending parallel to said plane of said data recording layer substantially throughout said layer.

3. The medium of claim 1, including support means for supporting said layer, said layer bonded to said support means.

4. The medium of claim 3 wherein said first zone is arranged proximate said support means and said second zone is remote therefrom.

5. The medium of claim 1 wherein said first and second zones have different thermal-mecanical properties.

6. The medium of claim 5 wherein the interface between said first and second zones is diffuse rather than discrete.

7. The medium of claim 1 wherein said material within said second zone having a different molecular structure than said material within said first zone.

8. The medium of claim 1 wherein said material within said second zone has a higher glass transition temperature than said material within said first zone.

9. A method for constructing an erasable data storage medium comprising:
(a) forming a substantially uniform layer of homogenous material on a supporting substrate, said layer having a bottom portion proximate said substrate, and a surface region remote from said substrate;
(b) treating the surface region of said layer so as to create a zone within said material having different optical properties than said bottom portion.

10. The method of claim 9, including treating the surface region of said layer so as to cause said surface region to have different thermal-mechanical properties than said bottom portion.

11. The method of claim 9, including treating the surface region of said layer with a solvent.

12. The method of claim 9, including using heat to treat said layer.

13. The method of claim 9 wherein said material includes additives, the method further including the step of leaching said additives out of said surface region.

14. The method of claim 9, including the step of diffusing an additive into said surface region.

15. The method of claim 13 wherein said additive includes a dye.

16. The method of claim 13 wherein said additive includes a plasticizer.

17. The method of claim 14 wherein said additive includes a dye.

18. The method of claim 14 wherein said additive includes a monomer or prepolymer.

19. The method of claim 13 wherein said additive includes a first dye, further including the step of diffusing a second dye into said surface region.

20. An erasable data storage medium including a data recording layer of a single integral material having at least two zones therein is constructed by the process of:
(a) forming a substantially uniform integral layer of homogenous material on a supporting substrate, said layer having a bottom portion proximate said substrate, and a surface region remote from said substrate; and
(b) treating said surface region of said layer so as to create a zone within said material having different optical properties than said bottom portion.

21. The medium of claim 20 wherein the process for constructing said medium includes treating said surface region of said layer so as to cause said surface region to have different thermal-mechanical properties than said bottom portion.

22. The medium of claim 20 wherein said surface region of said layer has been treated with a solvent.

23. The medium of claim 20 wherein said material includes an additive which is leached out of said surface region.

24. The medium of claim 20 wherein an additive is diffused into said surface region.

25. The medium of claim 23 wherein said additive includes a dye.

26. The medium of claim 23 wherein said additive includes a plasticizer.

27. The medium of claim 24 wherein said additive includes a dye.

28. The medium of claim 24 wherein said additive includes a plasticizer.

29. The medium of claim 24 wherein said additive includes a monomer or prepolymer.

30. The medium of claim 23 wherein said additive includes a first dye, and a second dye is diffused into said surface region.

* * * * *

UNITED STATES PATENT AND TRADEMARK OFFICE
CERTIFICATE OF CORRECTION

PATENT NO. : 4,901,304
DATED : February 13, 1990
INVENTOR(S) : Michael A. Lind, et al It is certified that error appears in the above-identified patent and that said Letters Patent is hereby corrected as shown below:

Col. 1, Line 53  Change "Ser. No. 525,813" to --Ser. No. 835,960--.

Col. 2, Line 16  Change "adapated" to --adapted--.

Col. 5, Line 1   Change "10.0" to --10.0--;

Col. 5, Line 16  Change "applicants'tests" to-- applicants' test--

Col. 5, Line 66  Change "m" to --$\mu$m--

Signed and Sealed this

Third Day of November, 1992

Attest:

DOUGLAS B. COMER

Attesting Officer    Acting Commissioner of Patents and Trademarks